(12) United States Patent  (10) Patent No.: US 7,891,953 B2
Gray et al.  (45) Date of Patent: Feb. 22, 2011

(54) ROTATING WEDGE LEVELER

(75) Inventors: John Gray, Charlottesville, VA (US);
Dean Corren, Burlington, VT (US);
Christopher Gray, Wheaton, IL (US)

(73) Assignee: Verdant Power, Arlington, VA (US)

( * ) Notice: Subject to any disclaimer, the term of this patent is extended or adjusted under 35 U.S.C. 154(b) by 1073 days.

(21) Appl. No.: 11/514,900

(22) Filed: Sep. 5, 2006

(65) Prior Publication Data

US 2008/0056906 A1   Mar. 6, 2008

(51) Int. Cl.
*F03B 3/00* (2006.01)
*F03B 3/04* (2006.01)
(52) U.S. Cl. .................. 416/246; 416/142; 416/244 R; 416/DIG. 6; 415/3.1; 415/4.3; 415/4.5; 248/219.2; 248/393; 248/188.2; 52/296; 52/573.1
(58) Field of Classification Search ............. 416/244 R, 416/244 A, 246, 142, DIG. 6; 415/3.1, 4.3, 415/4.5, 906, 908; 248/219.2, 393, 188.2, 248/676; 52/296, 573.1
See application file for complete search history.

(56) References Cited

U.S. PATENT DOCUMENTS

| 3,021,638 | A | * | 2/1962 | Kristek | .................... | 248/188.2 |
| 3,306,562 | A | * | 2/1967 | Bellefleur | ................ | 248/188.2 |
| 4,524,285 | A | * | 6/1985 | Rauch | .......................... | 290/43 |
| 2005/0271501 | A1 | * | 12/2005 | Walters | ....................... | 415/3.1 |
| 2006/0048471 | A1 | * | 3/2006 | Lee | ............................. | 52/296 |

* cited by examiner

*Primary Examiner*—Christopher Verdier
(74) *Attorney, Agent, or Firm*—Davidson Berquist Jackson & Gowdey, LLP

(57) ABSTRACT

An apparatus and method for mounting underwater turbines that includes a mechanism for correcting tilt error, including both the amount and direction of error, associated with the installation of underwater turbines onto anchoring or mounting structures so that the yaw axis of the mounted turbines will be as close as possible to a desired angle, preferably vertical.

16 Claims, 7 Drawing Sheets

ROTATING WEDGE LEVELER

CROSS-REFERENCE TO CO-PENDING APPLICATIONS

The present application is related to co-pending U.S. Patent Applications: (1) U.S. application Ser. No. 11/727,112, filed on Mar. 23, 2007, entitled "Cable Jacket Sealing, Pressuring, and Monitoring" (2) U.S. application Ser. No. 11/429,268, filed on May 8, 2006, entitled "Single Sided Power Generating Support Frame", now U.S. Pat. No. 7,597,532, (3) U.S. application Ser. No. 11/634,847, filed on Dec. 7, 2006, entitled "Non-Fouling Kinetic Hydro Power System Axial Flow Blade Tip Treatment" and (4) U.S. patent application Ser. No. 11/400,281, filed on Apr. 10, 2006, entitled "Kinetic Hydropower From Slow Moving Waters" now U.S. Pat. No. 7,456,514.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This disclosure relates to underwater mounted Kinetic Hydro Power (KHP) system turbines, and in particular to both a method and apparatus for providing adjustability when mounting under water turbines to correct for tilt errors occasioned by the installation of supporting structures or anchors. The embodiments described herein allow turbines to be installed underwater so that the nacelle of the turbine, the rotor and all of the operating structures, are positioned in a level condition regardless of the anchoring system so that the turbine can operate and rotate in an unimpeded way about a vertical, plumb yaw axis in a moving water flow. When this mounting is achieved, the turbine's yaw axis will be as close to a perfectly vertical condition as possible. Following mounting, the pylon's mounting flange, which is perpendicular to the pylon, will be secured to a level surface. and the pylon assembly will be plumb.

INTRODUCTION

This mounting requirement is desired since if the turbine is tilted when mounted, the overhung weight of the turbine, which results from the fact that the rotor is a considerable distance from the yaw axis, would tend to favor settling the turbine's orientation in the direction of any tilt. This would adversely affect the yawing performance of the turbine, and the type and amount of such adverse positioning would depend on the amount of tilt and the direction (azimuthal angle) of the tilt relative to the direction(s) of the water current. Where the KHP system turbines are operating in tidal currents, a gradually increasing tidal current moving in a new direction (approximately reversed from the previous direction) may not be strong enough to be able to provide enough yawing torque to turn the turbine "uphill" or with enough force to overcome the forces resulting from the overhung turbine until it has increased in speed to a point beyond that desirable, effectively increasing the "cut-in" speed at which the turbine begins to generate useful power.

Improper or tilted mounting could also result in the turbine chronically not facing accurately into the direction of the current ("yaw error"), or cause the turbine to yaw too slowly. Both of these could result in lowered energy capture. In fact, if the tilt angle were severe enough, the turbine could fail to yaw properly at all.

DESCRIPTION OF PRESENTLY PREFERRED EXAMPLES OF THE INVENTION

Brief Description of Figures

The invention is better understood by reading the following detailed description with reference to the accompanying drawings in which.

DETAILED DESCRIPTION

A typical KHP turbine system is described in U.S. Pat. No. 4,613,279 the entire contents of which are incorporated herein by reference and will be assumed to be known to the reader. Typical KHP turbine systems employ one or more turbines anchored to a base within flowing water, for example a river bottom, each of which include an external rotor that rotates in response to water flowing there past via a sealed rotating shaft coupled to the nacelle or the body of the turbine. The nacelle, desirably, is a watertight enclosure which houses machinery comprising various electrical and mechanical components that supports the rotor. Rotation of the rotor causes the electrical and mechanical components to generate power and suitable cabling and connections are provided so that electrical control or data signals can be sent between the turbine and a shore station, and so that generated power can be transmitted from the turbine onto a power grid or other load.

Figure 1:
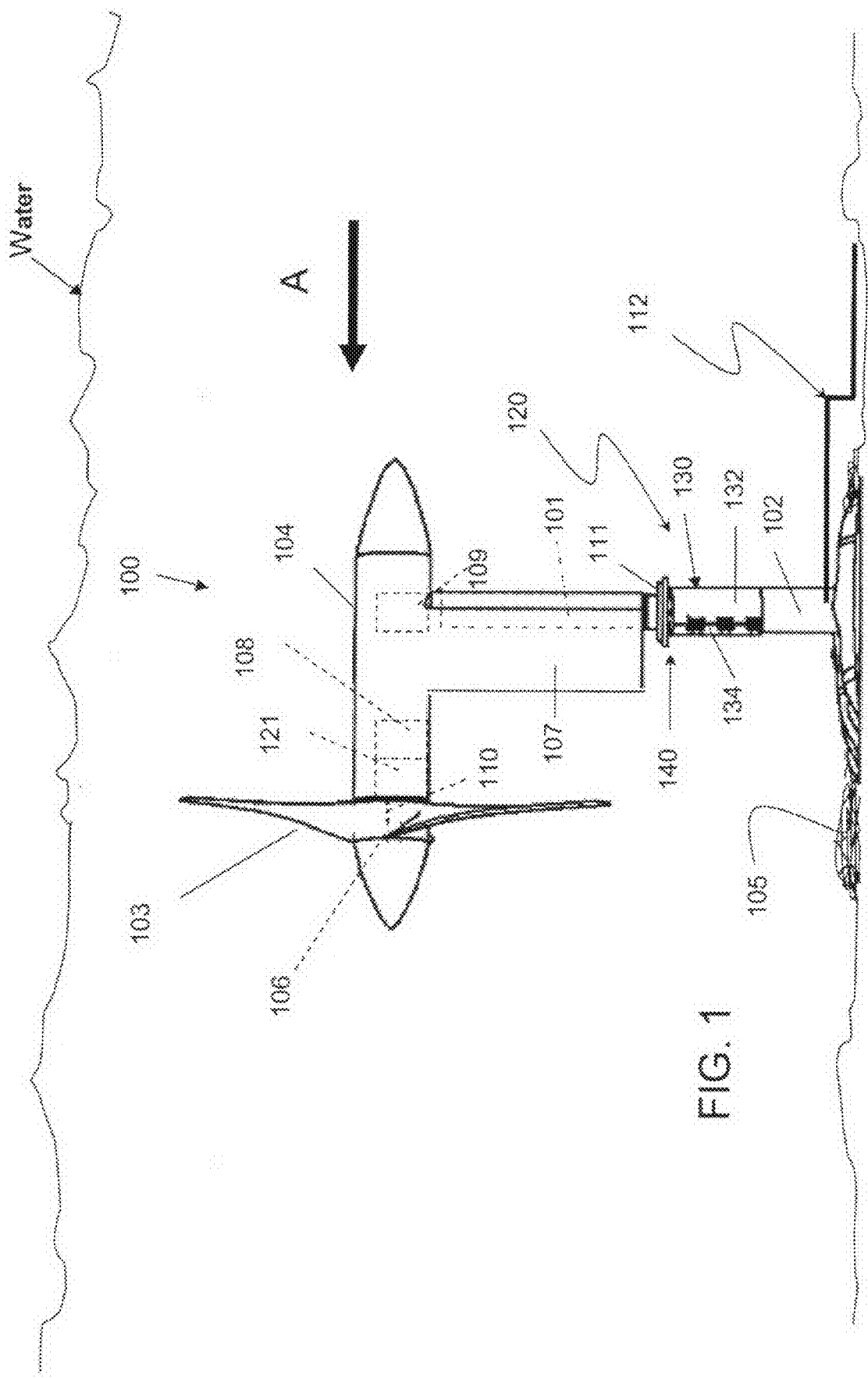
FIG. 1 is a diagrammatic elevational view of a mounted KHP system turbine.

In order for any KHP turbine 100 shown in FIG. 1 to be most useful, and to produce power most efficiently, it is important that the turbine, the nacelle and the supporting pylon be properly oriented in the flowing water or fluid stream, whether its supporting structure is installed on the bottom, surface, or edge of the water channel, stream, river, estuary, or the like. Ensuring that the primary mounting mechanism for turbine 100 is nearly level (or plumb, as the case may be), that is, where the yaw axis of the turbine 100 and of the pylon 101 is essentially vertical, is achieved by using an adjustable mounting and leveling assembly 120 that can correct for reasonable tilt errors away from a level surface (or a plumb or vertical axis, as the case may be), thereof in the fixed mounting structure. This approach can be used with any fixed mounting technique, including any type of pile, monopile, gravity base, tension anchor base, or any other fixed anchoring base or structure. The embodiments disclosed herein allow for the desired mounting of a turbine on any form of underwater mounting structure.

FIG. 1 shows an exemplary embodiment of a KHP system turbine of the present invention. One such KHP turbine 100 is shown as being mounted, for example to the bottom of a river 105 or to the bottom of some other body of flowing water by a pile or monopile 102. The turbine 100 comprises three main portions including a rotor 103 which is rotatably mounted to machinery contained within a nacelle 104 and inner and outer pylons 101 and 107, respectively. The nacelle 104 can be attached to the outer pylon 107 or made part of it. In one embodiment, the inner pylon 101 is attached to the pile 102 by a mounting and leveling assembly 120 in such a way that the outer pylon 107 and nacelle 104 are able to rotate about the vertical axis of the inner pylon 101 on bearings 122. The mounting assembly 120 permits a range of mounting angles to be created by relative movement between the parts of the mounting assembly 120 to counteract the tilt angle errors that may have arise during or as a result of the installation of the pile or similar mounting structure 102 away from a precisely plumb vertical condition. This ability to create tilt error correction mounting angles will assure that the turbine's yaw axis about the axis of the inner pylon 101 will be as close to a perfectly vertical condition as is possible following mounting. This allows rotor 103 to optimize its orientation and position for appropriately responding to current flow azimuthal direction changes and thereby be in the best position for generating power within the flow of the water, regardless of changes in the direction of that water flow and the force of such flows. For example, in a tidal environment nacelle 104 and rotor 103 will be able to face one direction when the tidal current is flowing one way yet rotate reasonable quickly into another position as tidal flow changes occur. Current flow direction is shown in FIG. 1 by arrow "A" for the water.

The nacelle 104 encloses suitable mechanical components including, for example, seals, bearings, and a gearbox 121, and suitable power generating components including, for example, a generator 108. Furthermore, the nacelle may include various electronic controls and monitoring components 109 such as for monitoring pressure, temperature, the pressure of water, or other operating, survival, or performance parameters.

A shaft 110 of the rotor 103 is rotatably coupled to the nacelle 104 through a dynamic shaft seal 106 that allows the shaft 110 to pass through seal 106 in a watertight manner, so that it can engage and operate the gears of the gearbox 121 which drives generator 108 in accordance with the rotation of the rotor 103 without allowing water to leak into nacelle 104. As generator 108 is driven via gearbox 121, generator 108 creates electrical power that is transmitted or fed onto a power grid or other load, as is known in the art. Turbine 100 can be suitably coupled to an on shore control station (not shown) via power and control cables shown at 112.

In the most basic case, turbine 100 would be completely reliable and self-sufficient, that is turbine 100 would simply generate power without needing to be controlled or monitored in any way. This would lower the cost of turbines 100 and the connections thereto, because electronic controls and monitoring components 109 could be eliminated from the system. Consequently, while turbine 100 as described herein, as possibly including various electronic controls and monitoring components 109, or other architectures of electronic controls and monitoring systems, those electronic controls and monitoring components 109 are exemplary and optimally may be omitted.

The electronic controls and monitoring components 109 can include several sensors such as temperature sensors (not shown) for measuring the temperature within the nacelle 104 or within one or more of the bearings or the generator, a tachometer (not shown) for measuring the rotational speed of rotor 103, an accelerometer (not shown) for measuring vibrations within turbine 100, a sensor (not shown) for sensing water within nacelle 104, a torque sensor (not shown) for measuring the mechanical power of the rotor 103, and various sensors for measuring the position or orientation of the nacelle 104 with respect to pile 102. Furthermore, sensors for detecting the pressure in the nacelle 104 can be included.

When used, signals from each one or more of these sensors allow an internal control system or one at an onshore control station to monitor the operation of turbine 100, to detect if turbine 100 is operating properly, or in a state which might cause damage to the turbine 100, and to detect the operating conditions in nacelle 104, as well as any malfunctions, and to control various aspects of turbine operation.

The mounting and leveling assembly 120, as shown, for example. in FIGS. 1-5, is comprised of a mounting clamp assembly 130 which supports and is connected to a mounting plate assembly 140. The mounting clamp assembly 130 is comprised of a lower portion that will fit over and be clamped to the pile 102, and an upper portion connected to the mounting plate assembly 140. The mounting clamp assembly 130 will fit over and provide the mechanism that secures the whole turbine to pile 102. Until secured in place, however, the mounting clamp assembly 130 will, in the initial phase of the securing process, allow the entire mounting and leveling assembly 120 to rotate to any azimuthal position relative to pile 102.

The mounting plate assembly 140 and the mounting clamp assembly 130 will collectively permit various mounting angles to be created to provide tilt correction to thereby counteract tilt error to the extent that the axis of pile 102 is not plumb or perfectly vertical. This turbine mounting approach permits the turbine's yaw axis to be brought as close as possible to being perfectly vertical. It should be understood that piles are installed using various techniques such as driving or drilling and grouting, and most pile or anchor installers will try to have the axis of the pile or anchor be within some specified tolerance. With respect to its position relative to vertical, the amount of correction to be provided by the mounting and leveling assembly 120 will need to be at least as great, and preferably in excess of that tolerance value. For example, if the pile 102 will be formed according to a tolerance that is supposed to be within 3° of vertical, then the mounting angle that would need to be created by the combined effects of mounting clamp assembly 130 and the mounting plate assembly 140 should be a tilt correction capability of about 4°. However, it should be understood that greater or lesser amounts of tilt correction can be built into the mounting and leveling assembly 120, and the correction range of a given mounting plate assembly could be as little, for example, as 0° to 1° to over 10°, limited primarily by the practicality of using such a tilted pile or other mounting structure. What is important is that each mounting and leveling assembly 120 itself be adjustable to correct for a range of errors associated with the primary mounting structure.

Mounting Clamp Assembly:

The mounting clamp assembly 130 employs a strong yet simple attachment mechanism which will tightly clamp the turbine 100 in place on pile 102, and is comprised of two, essentially near-half cylinders 132 and 134, formed, for example, plastic, reinforced plastic, metal, such as, for example, 50 KSI steel. The cylinders 132 and 134 can be shaped in the form of pipe sections of the same or slightly larger diameter as the pile. Alternatively, they can be bent from suitable metal plate stock, or otherwise formed or molded to the desired initial curvature (larger than the pile) or even with multiple curvatures. The material from which the half cylinders 132 and 134 are formed needs to be strong, preferably resistant to or coated to provide protection against corrosion and the effects of the underwater installation. Cylinders 132 and 134 will be bolted together using a plurality of dogs or angle brackets 136, formed from carbon steel or other suitable material, which have been welded or otherwise affixed to the cylinders 132 and 134 at spaced apart locations along their marginal edges. Typical pile diameters can range in size from about 6 to about 60 inches, and the half-cylinders 132 and 134 can have a length ranging from about 24 to about 120 inches. For very large turbines these dimensions will be greater.

Bolts 135, for example, made from steel, will engage the brackets 136 and pull the half cylinders 132 and 134 together so that they clamp tightly around the outside surface of pile 102, preferably near its top depending upon is height from the river bottom. It should be understood that references herein to bolts is meant to be expansive and not limiting, and includes bolts that are threaded into one of the two mating parts, lock bolts, combinations of bolts, washers and nuts, or any other type of connecting or fastening mechanism or approach that will securely hold mating parts together in a fixed and tight manner.

During the mounting process, these two half cylinders 132 and 134 will be initially loosely held together by bolts 135 so that they begin with a diameter between them that is larger than the diameter of pile 102 yet which allows the mounting and leveling assembly 120 to be easily slipped over the top of the pile 102, by divers, or where divers are not being used the turbine can be positioned on the pile by other above water turbine lowering or maneuvering apparatus, in underwater conditions of low visibility, limited time, limited dexterity and varying water currents. In the simplest version, a portion of the mounting plate assembly 140 connected to the mounting clamp assembly 130 will engage and rest on the top edge of the pile 102, as shown in FIG. 3, holding the mounting and leveling assembly 120 roughly in place until the mounting and leveling assembly 120 is adjusted to a correct position and the two half cylinders 132 and 134 are tightened and fully clamp around pile 102.

Figure 2:
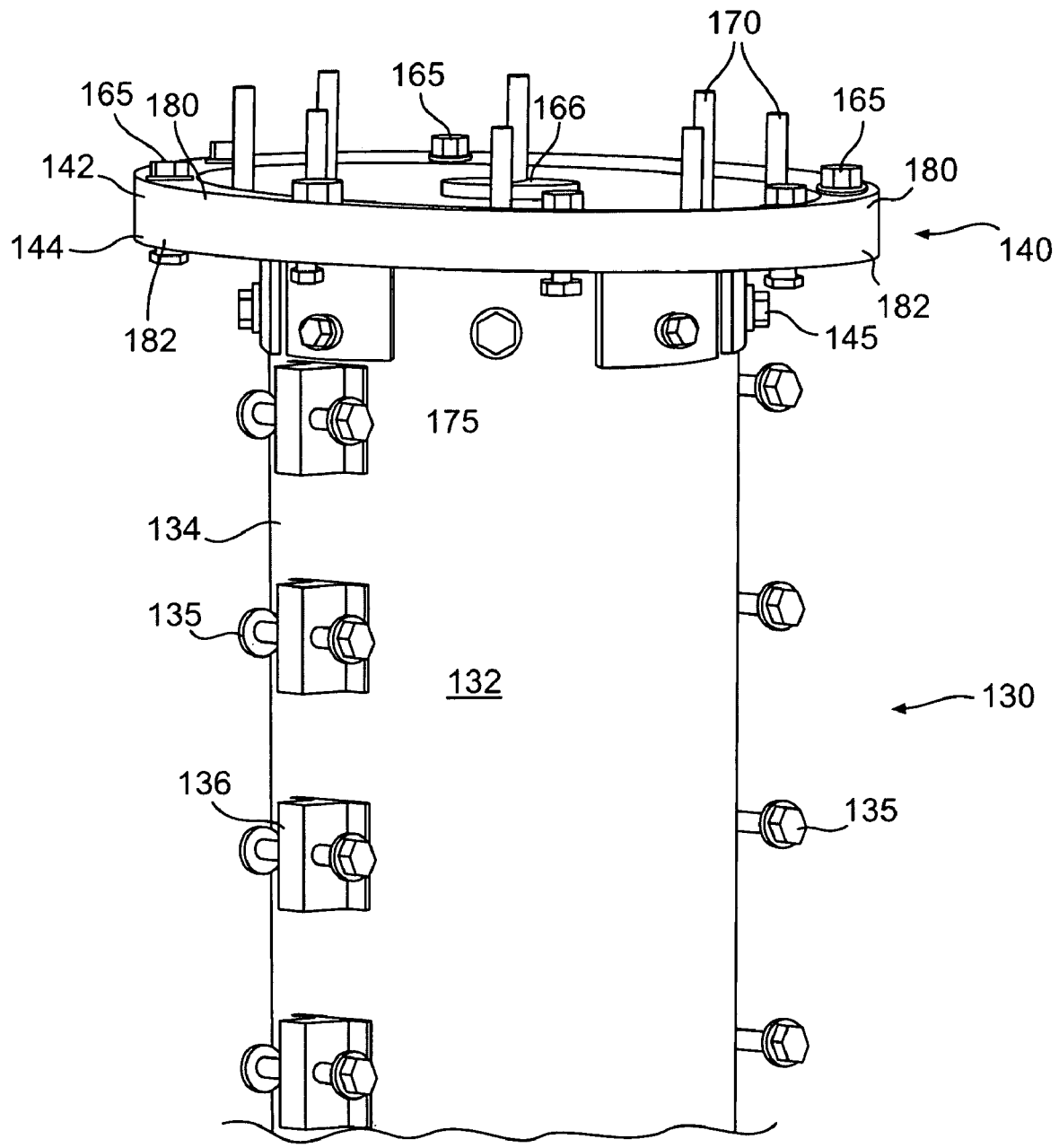
FIG. 2 is an elevational and partly perspective view of the mounting and leveling assembly.
Figure 3:
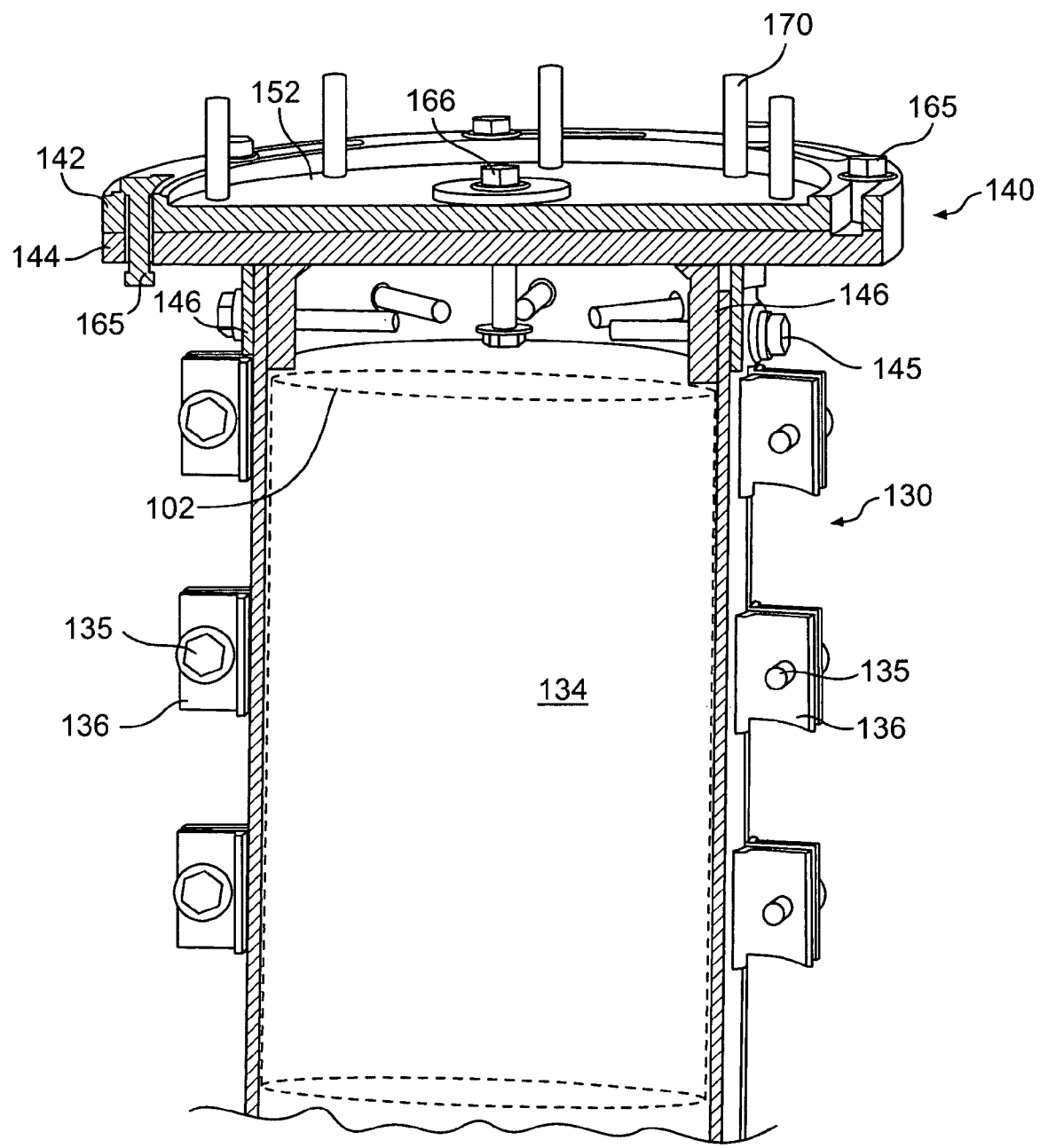
FIG. 3 shows a cross-sectional view of the structure shown in FIG. 2.
Figure 4:
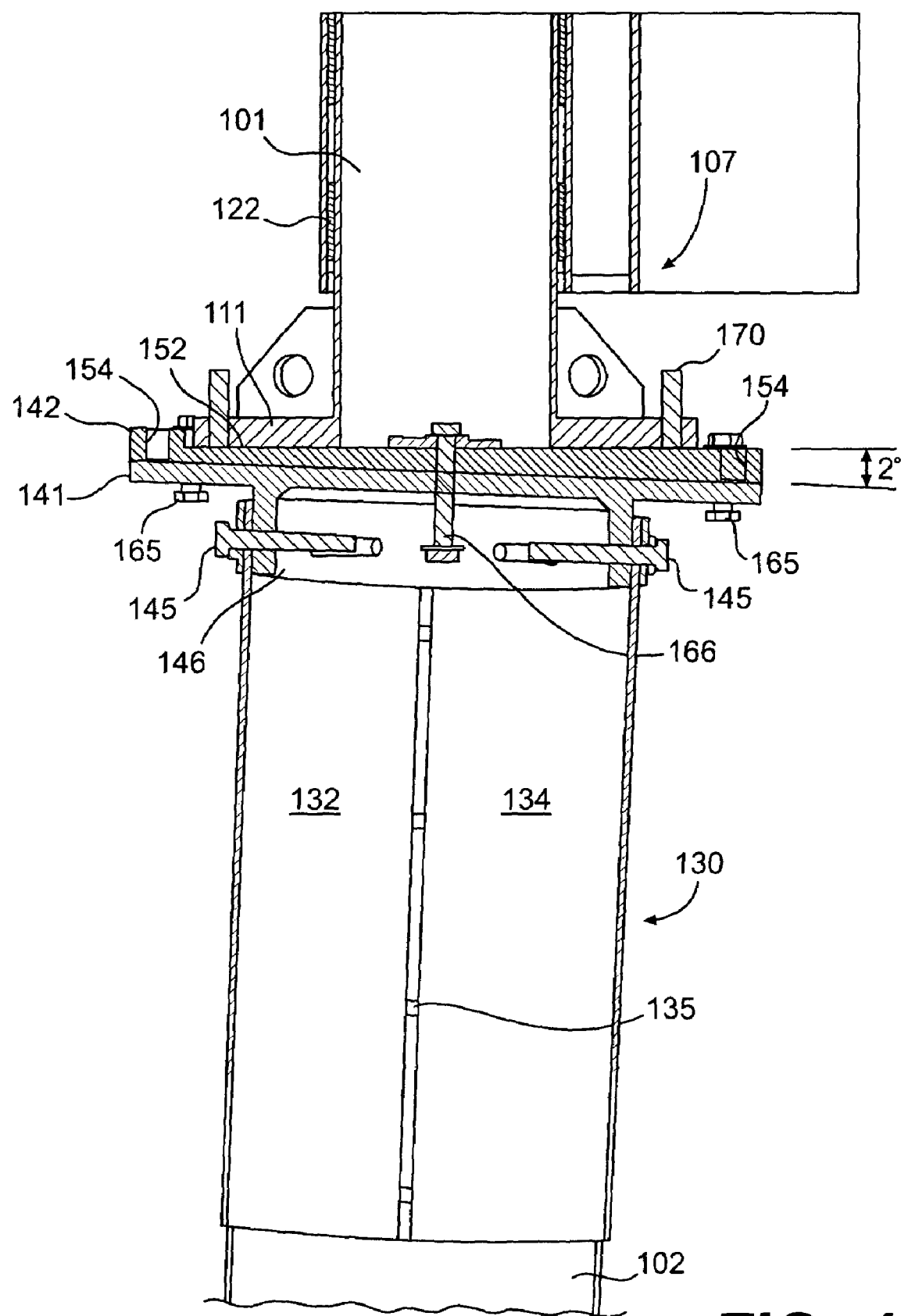
FIG. 4 shows a diagrammatic cut away view of the mounting structure.
Figure 6:
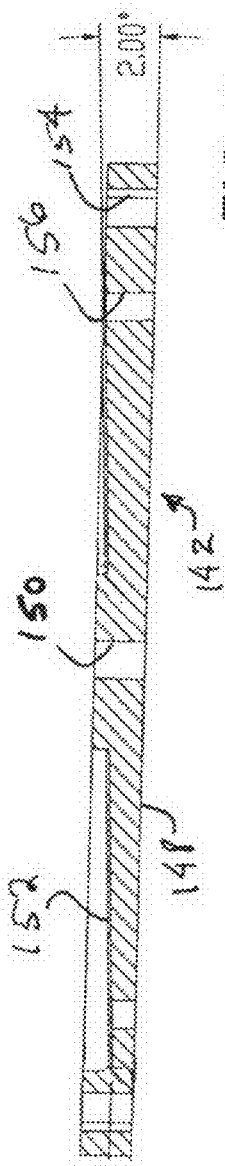
FIG. 6 is a cross-sectional view of an upper mounting plate
Figure 7:
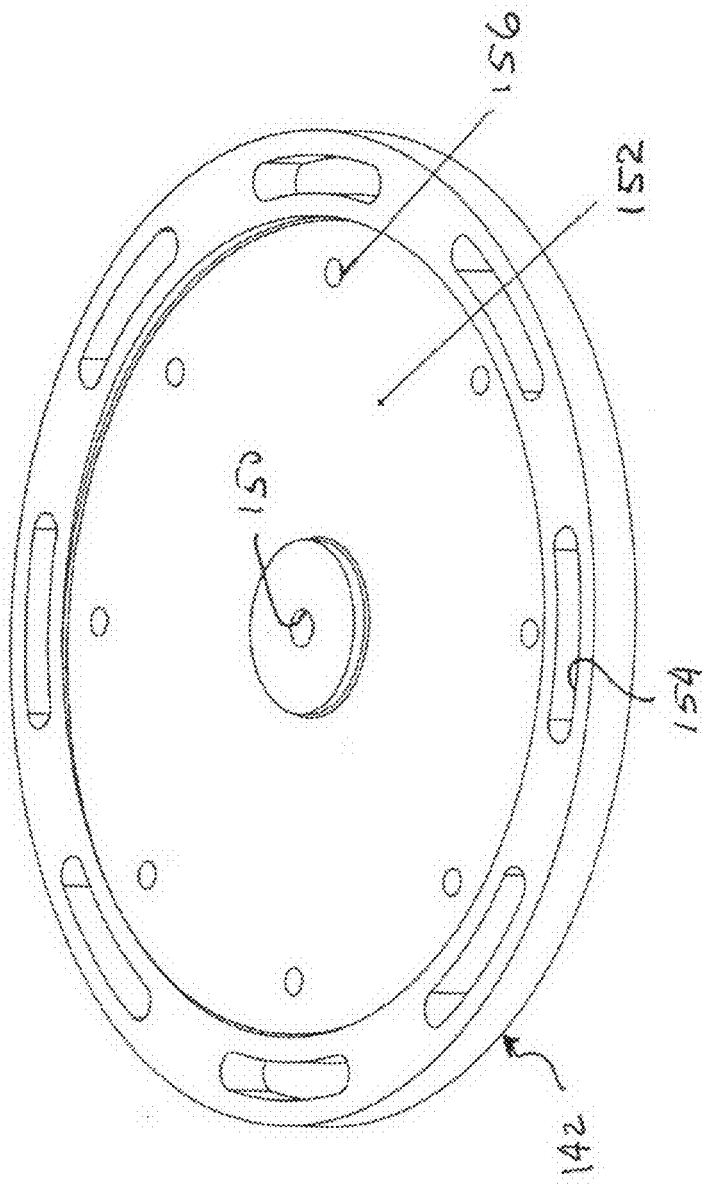
FIG. 7 is a perspective view of the upper mounting plate.
Figure 8:
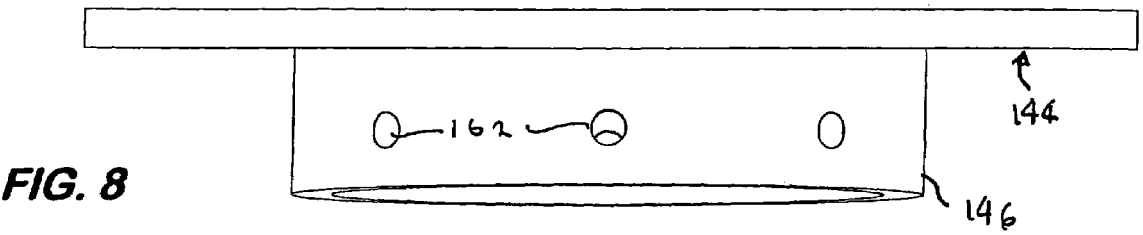
FIG. 8 is an elevational view of a lower mounting plate.
Figure 10:
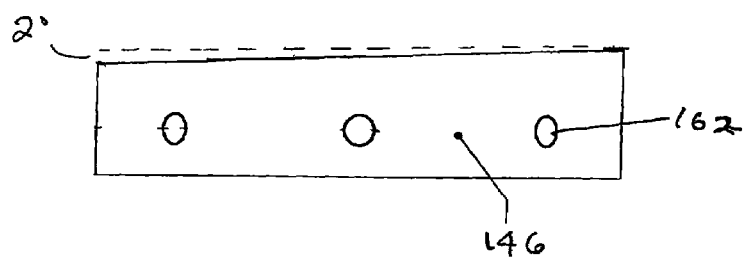
FIG. 10 is an elevational view of a mounting collar used on the lower mounting plate.
Figure 9:
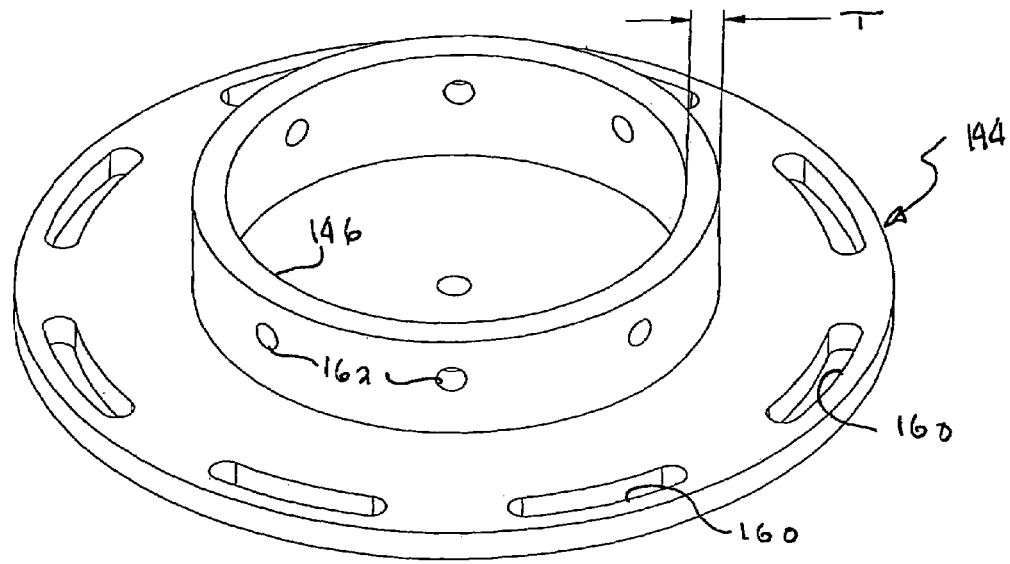
FIG. 9 is a perspective view of the lower mounting plate.

Mounting Plate Assembly:

The mounting plate assembly 140 includes two mating plates, an upper plate 142, shown in FIGS. 2-4, and in greater detail in FIGS. 6 and 7, on which the inner pylon 101 will be attached, via a mounting flange 111 as in FIG. 4 by a plurality of mounting studs or bolts 170, and a lower plate 144, shown in FIGS. 8-10, to which a depending collar 146 is welded or otherwise fixed. Collar 146 is itself connected to the mounting clamp assembly 130, for example by steel bolts 145 that pass there through. As shown in FIGS. 3 and 4, after the mounting clamp assembly 130 is slid over pile 102, the bottom of collar 146 will rest on and initially support the mounting and leveling assembly 120 on pile 102, which is shown in phantom in FIG. 3. Plates 142 and 144 as well as collar 146 can be formed from plain carbon steel, mild steel or other grades of steel or stainless steels, with suitable coatings to protect against corrosion, rusting or other effects of the under water environment.

The interaction between the mounting clamp assembly 130 and the mounting plate assembly 140 will produce the ability to develop a controlled and varying angle between the former and the turbine flange mounting area of the latter, so that the direction of the tilt between the mounting components connected thereto, can be varied to correct for tilt error away from a plumb or vertical condition in the mount structure, such as pile 102.

As shown in FIG. 6, the upper plate 142 includes a generally flat and planar bottom surface 148, a central opening 150 and a portion of its upper surface 152 that is at an angle to its bottom surface and that will be the leveled surface to which the inner pylon 101 will be attached. The angled portion of the upper surface 152 is formed or machined at an angle, for example, such as the non-limiting 2° as shown in FIGS. 4 and 6, but other greater or lesser angles could be produced, ranging from 0° to about 100, depending upon how much tilt correction was expected to be needed in view of the possible tilt error that might exist in the mounting pile or other mounting structure. Upper plate 142 can be about 2 inches thick and about 40 inches in diameter, but could have a diameter ranging from about 12 to about 80 inches, and accordingly greater thickness.

FIG. 7 shows upper plate 142 in a perspective view and shows the taper of upper surface 152 beginning on the left side and ending on the right side. In addition, mounting slots 154 and pylon mounting holes 156 are formed in upper plate 142.

FIGS. 8-10 show the lower plate 144 and the collar 146 mounted thereto. Plate 144 includes mounting slots 160, that will cooperate with slots 154, while collar includes radially oriented mounting holes 162 into which bolts 145 secure the top of the two half cylinders 132 and 134 to the collar 146 as shown in FIGS. 2 and 3. Bolts 165, preferably formed from high grade or stainless steel, are used in slots 154 and 160 to secure upper plate 142 to lower plate 144 as shown in FIGS. 2 and 3. Turbine mounting bolts or studs 170, preferably eight of them as shown in FIGS. 2 and 3, are fixed or otherwise anchored in holes 156 and extend upwardly from surface 152, and a mounting flange 111 at the base of inner pylon 101, shown in FIG. 1, will be secured onto surface 152 (the leveled surface) thereby.

Collar 146, as is best shown in FIG. 10, could also be formed to have a 2° angle from one side 146a toward the opposite side 146b, but as above, this is a non-limiting example and greater or lesser angles could be provided. The height of the collar at side 146a is about 6 inches while the collar has a height of about 5.2 inches at side 146b. As a consequence, once lower plate 144 is welded or fixed to collar 146 it too will have a 2° tilt relative to the pile. Here again, the degree or amount of slope built in to collar 146, and thus the combined angle of correction that can be achieved, can vary, and the collar slope can vary, for example, from about 0.5° to about 5° to achieve a combined angle of correction of about 0° to 1° to 0° to 10°.

Mounting Procedure

Figure 5:
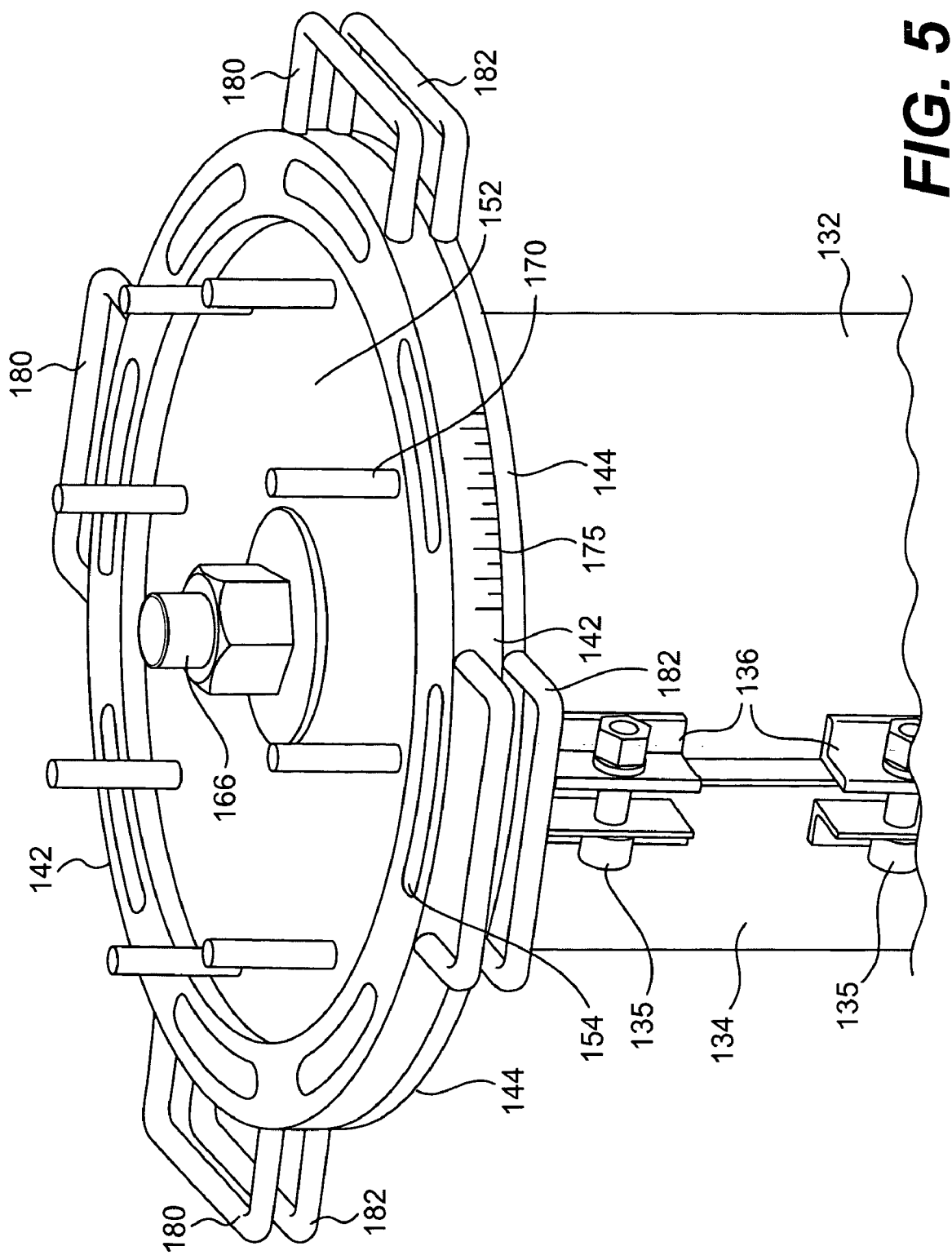
FIG. 5 shows a perspective view of the upper portion of the mounting assembly.

The mounting procedure will involve first loosely connecting together the two halves of the mounting clamp assembly 132 and 134 by bolts 135. Then, radial bolts 145 will loosely mount collar 146 in place so that its attached lower plate 144 will be attached to the mounting clamp assembly 130. Upper plate 142, to which the inner pylon 101 mounting studs 170 have been attached, is then mounted to the lower plate by plate bolts 165 and a central pin or bolt 166 will loosely fasten the two plates 142 and 144 together, yet allow relative rotational movement there between. Next, the now assembled mounting clamp assembly 130 will be slipped down over pile 102 until collar 146 is in contact with the top of the pile 102 as shown in FIG. 2. Then, bolts 135 will be partially tightened enough to align the clamp halves 132 and 134 while still allowing rotation thereof relative to pile 102. Then, the objective is to make upper surface 152 level. As initially set up, plates 142 and 144 will be placed together in a "zero net correction" position. To aid in that alignment, suitable scales, as indicated at 175 in FIG. 5, can be provided on the exterior side edges of the plates 142 and 144. The next step is to measure the tilt error angle, the error of the surface 152 from a level condition, and the azimuthal direction of the tilt. This is accomplished by using accurate level sensors on surface 152. Then, using optional handles 180 and 182, as shown in FIG. 5 being respectively fixed to plates 142 and 144, the upper plate 142 can be rotated about pin or bolt 166 relative to lower plate 144 until the needed correction angle is reached, as indicated by scales 175. At that point the upper and lower plates 142 and 144 can be locked together by tightening plate bolts 165.

To correct for any directional errors, the entire mounting and leveling assembly 120 can be rotated relative to pile 102 until surface 152 is level. If needed, plate bolts 165 could be loosed again and an additional tilt error adjustment could be made. Further, additional directional adjustment could also be made by additional rotation of the mounting and leveling assembly 120 relative to pile 102 so that the azimuthal direction of the tilt can also be fully compensated for during the adjustment to the mounting and leveling assembly 120. It might be that only small additional corrections or adjustments might be needed, none might be needed or only one or the other may require further adjustment, and any such additional adjustment might be very small or minor to achieve a truly level condition for surface 152.

Once the tilt error is fully corrected and surface 152 is level, so that no further directional correction or adjustment is needed, all remaining bolts can be tightened to fully clamp and lock the mounting and leveling assembly 120 onto pile 102. Thereafter, turbine 100 can be lowered and the mounting flange on the bottom of the inner pylon 101 can be bolted to the now-leveled surface 152.

Thus, the combination of relative movements between the upper and lower plates, 142 and 144 about pin 166, as well as the rotation of the mounting clamp assembly 130 relative to pile 102 will allow both tilt and directional errors in the anchor or pile to be compensated for to assure a perfectly plumb and vertical yaw axis for the turbine. By having the surface 152 angled at a 2° slant, and by having the lower plate at a similar 2° slant, due to the construction of collar 146, there is the ability to correct for up to a 4° tilt error away from a precisely plumb vertical for the pile 102 by counter rotating upper plate relative to lower plate 144. At a point during such relative movement and adjustment of the mounting and leveling assembly 120, the upper surface 152 will be generally level and ready to receive the mounting flange of inner pylon 101 thereon.

It should be understood that slopes other than the 2° discussed above for surface 152 and for collar 146 could be used. The two angles chosen may be in any combination of equal angles, e.g., 3 degrees each, which would then allow the system to compensate for 0 to 6 degrees of tilt.

There are several benefits from employing this mounting technique and apparatus. First, this pile mounting solution for mounting the turbine assembly will assure that passive yaw is facilitated which is more reliable and cost-effective than an active yaw system or a less-efficient, non-yawing turbine. Second, even though it is adjustable, the mounting and leveling assembly 120 has a rugged and rigid design for long life and good turbine performance. Further, the mounting approach and process is one that is readily installed by divers, and all parts of the mounting and leveling assembly 120 can be preassembled above water so that there are no loose parts to contend with underwater and the bolts need only be initially tightened by the divers during the adjustments and fully tightened once surface 152 is found to be in a level condition. This also reduces costs by not needing specially plumbed piles or other leveled mounting structures. In addition, this mounting technique permits a leveled turbine mounting arrangement to be implemented on pre-existing structures that have no otherwise level or plumb elements. Finally, a wide range of various pile top conditions can be accommodated by the mounting and leveling system's design rather than by trying to provide time consuming customizing actions by the divers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An error correction mechanism for adjustably mounting a turbine to an underwater mounting structure comprising:

a multipart mounting assembly for supporting a turbine pylon thereon that permits individual parts of the multipart mounting assembly to be relatively moveable to one another to thereby create angular corrections to compensate for errors away from a desired angle relative to the mounting structure, the multi-part mounting assembly including upper and lower mounting plates, the upper mounting plate comprising a plate having an outer rim, a central portion, a planar bottom surface, a planar supporting surface defined between the outer rim and the central portion and positioned at an angle from one side of the upper mounting plate to an opposite side thereof, and a mounting mechanism for receiving the turbine pylon on the plantar supporting surface, the lower mounting plate comprising a plate member including a depending collar, the depending collar having an upper edge mated with a lower surface of the lower mounting plate and being formed with an angle from one side to an opposite side, the lower mounting plate being mounted to a support pile anchored to a bottom of an underwater location, the upper mounting plate being movable relative to the lower mounting plate to thereby render the planar supporting surface in a position to produce a mounting surface for the turbine that will establish a vertical yaw axis for the mounted turbine.

2. The mounting mechanism as in claim 1 wherein the desired angle is vertical.

3. The mounting mechanism as in claim 1 wherein the desired angle has an associated tolerance of between +/−0° and +/−1°.

4. The mounting mechanism as in claim 1 wherein both and directional errors can be compensated for by adjustment of the mounting assembly.

5. The mounting mechanism as in claim 1 wherein the depending collar has a bottom edge that is in contact with an upper surface of the support pile.

6. The mounting mechanism as in claim 5 wherein relative rotation of the upper and lower mounting plates varies the net slope of the mounting surface.

7. The mounting mechanism as in claim 1 wherein the planar supporting surface comprises a circular wedge at an angular slope ranging from 0° to 10°.

8. The mounting mechanism as in claim 1 wherein the depending collar provides a sloped mounting for the plate member tha ranges from 0.5° to 5°.

9. The mounting mechanism as in claim 1 further including a mounting clamp assembly mounted to the lower mounting plate and being comprised of shaped opposing members designed with an internal shape that is complimentary to the outer shape of the support pile, and a plurality of clamp members positioned at spaced apart locations along marginal edges of each of the plurality of opposing members so that the opposing members can be drawn together and thereby clamped about the support pile.

10. The mounting mechanism as in claim 9 wherein each of the clamp members has a half cylinder shape.

11. The mounting mechanism as in claim 1 wherein the upper mounting plate further includes a plurality of spaced apart open slots formed in the outer rim and adjacent an outer edge thereof and a series of bolt receiving openings spaced apart circumferentially about the planar supporting surface.

12. The mounting mechanism as in claim 1 wherein the lower mounting plate further includes a plurality of spaced apart open slots formed in an outer rim and adjacent an outer edge thereof, and wherein the depending collar includes a plurality of spaced apart apertures formed therein.

13. The mounting mechanism as in claim 1 wherein the upper mounting plate can rotate relative to the lower mounting plate to thereby produce a variety of angular positions, one relative to the other, to thereby achieve a desired relative position that places the yaw axis of the turbine in a substantially vertical condition and to be there after locked together in the desired relative position.

14. The mounting mechanism as in claim 1 wherein the lower mounting plate further includes a clamp structure secured thereto and being removably secured to the support pile.

15. The mounting mechanism as in claim 9 wherein the mounting clamp assembly is removably mounted to the lower mounting plate.

16. The mounting mechanism as in claim 14 wherein the clamp structure is adjustably secured to the support pile.

* * * * *